United States Patent [19]
Davis

[11] Patent Number: 4,527,911
[45] Date of Patent: Jul. 9, 1985

[54] LUBRICATION SYSTEM

[75] Inventor: Joseph Davis, Vernon, Conn.

[73] Assignee: United Technologies Corporation, Hartford, Conn.

[21] Appl. No.: 487,776

[22] Filed: Apr. 22, 1983

[51] Int. Cl.³ .......................... F16C 39/04; F16C 37/00
[52] U.S. Cl. ..................................... 384/99; 384/471; 384/316
[58] Field of Search ................. 384/99, 316, 313, 900; 308/184 R, 187, 187.1

[56] References Cited

U.S. PATENT DOCUMENTS

| | | |
|---|---|---|
| 2,992,842 | 7/1961 | Shevchenko et al. ............... 384/316 |
| 4,337,983 | 7/1982 | Hibner . |
| 4,400,098 | 8/1983 | Lacey et al. ........................... 384/99 |
| 4,429,923 | 2/1984 | White et al. ..................... 308/184 R |

Primary Examiner—Lenard A. Footland
Attorney, Agent, or Firm—Norman Friedland

[57] ABSTRACT

An oil transfer tube for a gas turbine engine lubrication system is fabricated with radial and axial passageways so that it permits oil to feed the bearing's fluid damper and distributes oil to the bearing itself. The transfer tube is easily removable without disrupting the adjacent assemblies.

3 Claims, 2 Drawing Figures

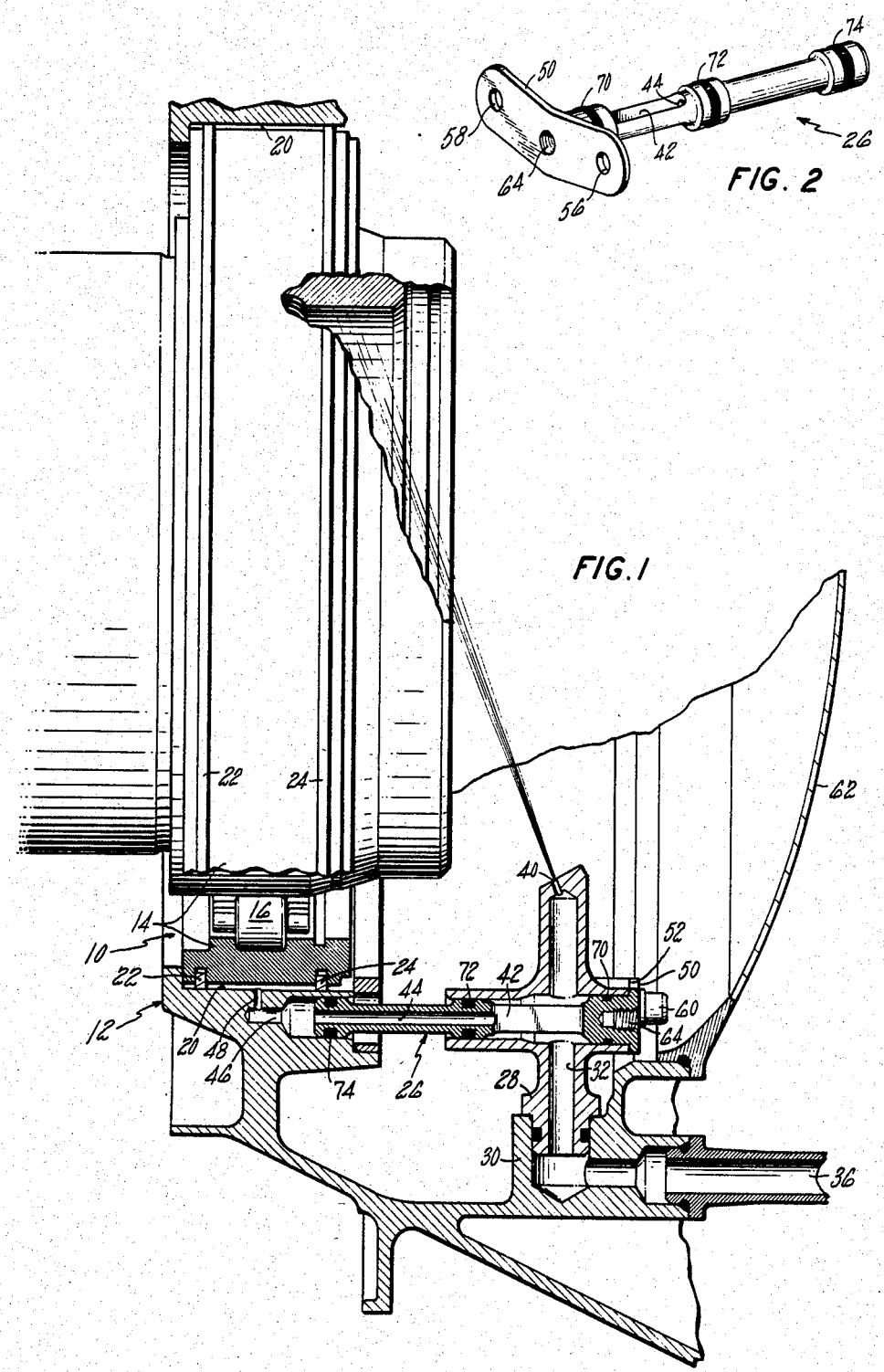

LUBRICATION SYSTEM

DESCRIPTION

TECHNICAL FIELD

This invention relates to gas turbine engines and more particularly to the oil feed system to the bearings supporting the rotor.

BACKGROUND ART

In certain engines it is sometimes necessary to include fluid dampers for high speed bearings supporting the engine rotors. For a description of such a fluid damper, reference should be made to U.S. Pat. No. 4,337,983, granted to D. H. Hibner on July 6, 1982 and assigned to the same assignee as this patent application. Obviously, all bearings require a suitable lubrication system to cool and lubricate the rotating parts.

It has heretofore been the practice to supply individually each of these systems with oil utilizing separate oil delivery lines and distribution systems. Namely, the viscous damper would have its own lubrication system and the bearing would have another lubrication system.

I have found that I can combine both functions utilizing a simple transfer tube resulting in the elimination of one of the lubrication systems. The transfer tube not only reduces the overall weight of the combined systems but also is less expensive to fabricate. A characteristic of the system is the easy removal of the transfer tube so that it can be maintained or replaced without the cumbersome task of removing a significant part of the engine, particularly the bearing assembly. It is contemplated that the transfer tube allows oil to flow both in an axial and radial direction.

DISCLOSURE OF INVENTION

An object of this invention is to provide an improved system that supplies oil to both the bearing and the fluid damper surrounding the bearing of a gas turbine engine. A feature of this invention is that the transfer tube combines a dual system into a single system and allows oil to flow axially to the bearing's damper and radially to the oil jet for cooling and lubricating the bearing.

Another feature of this invention is the simple attachment means allowing for the removal of the transfer tube without distrubing adjacent components. This system is characterized as weighing less than the heretofore known systems and is less expensive and less cumbersome to manufacture.

Other features and advantages will be apparent from the specification and claims and from the accompanying drawings which illustrate an embodiment of the invention.

BRIEF DESCRIPTION OF DRAWINGS

FIG. 1 is a fragmentary portion view partly in elevation and partly in section showing a portion of the roller bearing assembly for supporting one of the shafts of a gas turbine engine and the improved lubrication system; and FIG. 2 is a perspective view of the transfer tube used in FIG. 1.

BEST MODE FOR CARRYING OUT THE INVENTION

Inasmuch as the invention is utilized solely on a particular bearing system for a gas turbine engine, for the sake of convenience and clarity only that portion of the engine is shown that is necessary to describe this invention. For a more detailed description of a suitable engine and typical bearing assembly, reference should be made to the JT9D engine models manufactured by Pratt & Whitney Aircraft, a division of United Technologies Corporation, the assignee of this patent application and which is incorporated herein by reference.

As can be seen in FIGS. 1 and 2, the bearing assembly generally indicated by reference numeral 10 is supported in the bearing compartment defined by the annular housing 12. This assembly serves to support the shaft and its accompanying rotors, say the low pressure spool of a twin spool engine, comprising the low pressure compressor and low pressure turbine.

The bearing assembly consists of an annular ring 14 defining the outer race supporting the roller bearing 16 which is radially spaced from the inner diameter 20 formed on the annular housing 12. Seals 22 and 24 axially spaced and supported between the housing 12 and ring 14 define an annular chamber which is continuously supplied with oil. As is apparent from the foregoing, this annular oil well defines the fluid damper that surrounds the bearing assembly 10.

According to this invention, the transfer tube 26 is supported to the extending support member 28 that fits into boss 30 formed on housing 12. Support member 28 carries an inner bore 32 that communicates with conduit 36. Conduit 36 is connected to the oil supply for providing lubricating oil to the bearing and fluid to the damper.

Bore 32 extends axially through support member 28 and feeds the jet hole 40 which is sized and located to form a jet stream of oil aimed at the inner diameter of the shaft and inner race of the bearing assembly. This oil serves to lubricate and cool the bearing.

As can best be seen in FIG. 2, a slot 42 is formed in transfer tube 26 and is oriented to align with bore 32 to allow the pressurized oil from conduit 36 to feed the oil jet 40 with a minimal of pressure drop.

A straight-through axial passageway 44 is formed in the body of transfer tube 26 extending from slot 42 rearwardly to communicate with the drilled hole 46 and the radial hole 48, and this serves to feed the fluid damper.

A flange 50 is formed as the end of transfer tube 26 and is adapted to fit against the face 52 of support member 28. Apertures 56 and 58 align with complementary tapped holes formed in support member 28 for accepting suitable bolts 60 to secure the transfer tube 26 into operation position.

Obviously the disassembly is relatively simple and requires merely the removal of bolts 60. Once cover 62, which is bolted to the bearing housing 12, is removed and a gripping means is inserted in the threaded hole 64 (this can accommodate bolt 60) the operator can use this as a handle to grab onto and pull out the transfer tube 26.

It is apparent that neither the bearing assembly nor the support assembly has to be dismantled in order to remove the transfer tube 26.

Spaced "O" rings 70, 72 and 74 are installed on the outer diameter of the transfer tube 26 to prevent leakage.

It should be understood that the invention is not limited to the particular embodiments shown and described herein, but that various changes and modifications may be made without departing from the spirit and scope of this novel concept as defined by the following claims.

I claim:

1. A combined fluid feed system for a roller bearing for a gas turbine engine and its fluid damper which bearing supports a rotary shaft, and which bearing is surrounded by said fluid damper, said system comprising means for lubricating and cooling said bearing and continuously supplying fluid to said damper, a single source of fluid for both the lubricating and cooling of said bearing and the fluid for said damper, said means including a transfer tube having an elongated cylindrical body, a housing for encapsulating said bearing, a support member adjacent said housing supporting said cylindrical body in a bore formed in said support member, conduit means interconnecting said source of fluid for leading lubrication to said bearing through a slot formed in said transfer tube directly to an orifice through a first passageway in said support member for directing said lubricant directly at said bearing and for leading fluid to said fluid damper through said slot and an axial passageway formed in said elongated cylindrical body transverse to said first passageway and drilled holes formed in said housing.

2. A combined fluid feed system as in claim 1 including spaced "O" seals disposed around said elongated cylindrical body, one of said "O" seals being disposed in a base of said housing and an other being disposed in a base in said support member.

3. A combined fluid feed system as in claim 2 including a flange on one end of said elongated cylindrical member adapted to fit up against a side face of said support member and retractable means for attaching said flange to said face whereby the removal of said retractable means allows the removal of said transfer tube without disassembly of said housing and said support member.

* * * * *